(12) United States Patent
Bub et al.

(10) Patent No.: US 6,987,444 B2
(45) Date of Patent: Jan. 17, 2006

(54) POWER LINE COMMUNICATIONS METHOD

(75) Inventors: Stephen Leonard Bub, Bronte (AU); William Douglas Rannard, Oatley (AU)

(73) Assignee: Pacific Solar Pty Limited, Botany (AU)

( * ) Notice: Subject to any disclaimer, the term of this patent is extended or adjusted under 35 U.S.C. 154(b) by 155 days.

(21) Appl. No.: 10/332,003

(22) PCT Filed: Jul. 6, 2001

(86) PCT No.: PCT/AU01/00818

§ 371 (c)(1),
(2), (4) Date: Feb. 18, 2003

(87) PCT Pub. No.: WO02/05449

PCT Pub. Date: Jan. 17, 2002

(65) Prior Publication Data

US 2003/0156013 A1    Aug. 21, 2003

(30) Foreign Application Priority Data

Jul. 7, 2000    (AU) .................................... PQ8659

(51) Int. Cl.
H04M 11/04    (2006.01)
(52) U.S. Cl. ........................ 340/310.01; 340/310.02; 340/310.04; 340/310.06; 363/37; 363/65

(58) Field of Classification Search ........... 340/310.01, 340/310.02, 310.04, 310.06, 825.22, 825.69, 340/825.72; 368/1, 8, 9; 363/37, 65, 66, 363/72; 379/58, 102, 56, 96; 375/37, 39, 375/259

See application file for complete search history.

(56) References Cited

U.S. PATENT DOCUMENTS

| | | |
|---|---|---|
| 5,264,823 A | 11/1993 | Stevens |
| 5,404,127 A | 4/1995 | Lee et al. |
| 5,491,463 A * | 2/1996 | Sargeant et al. ....... 340/310.01 |
| 6,040,759 A | 3/2000 | Sanderson |
| 6,252,823 B1 * | 6/2001 | McDonald et al. ............ 368/9 |

* cited by examiner

*Primary Examiner*—Hung Nguyen
(74) *Attorney, Agent, or Firm*—Jordan and Hamburg LLP

(57) ABSTRACT

A method of communicating over a power line is disclosed, the method comprising the step of modulating a current component of an AC power signal present on the power line. Also disclosed is a communications protocol for communication between a monitoring unit and an appliance, the protocol having two modes of operation, the first mode being an on-line single direction protocol for communications from the appliance to the monitoring unit via modulation of a current component of an AC power signal between the monitoring unit and the appliance, and the second mode being an off-line protocol for communications at least from the monitoring unit to the appliance, the second mode being operable only when the power signal is not present between the monitoring unit and the appliance.

20 Claims, 5 Drawing Sheets

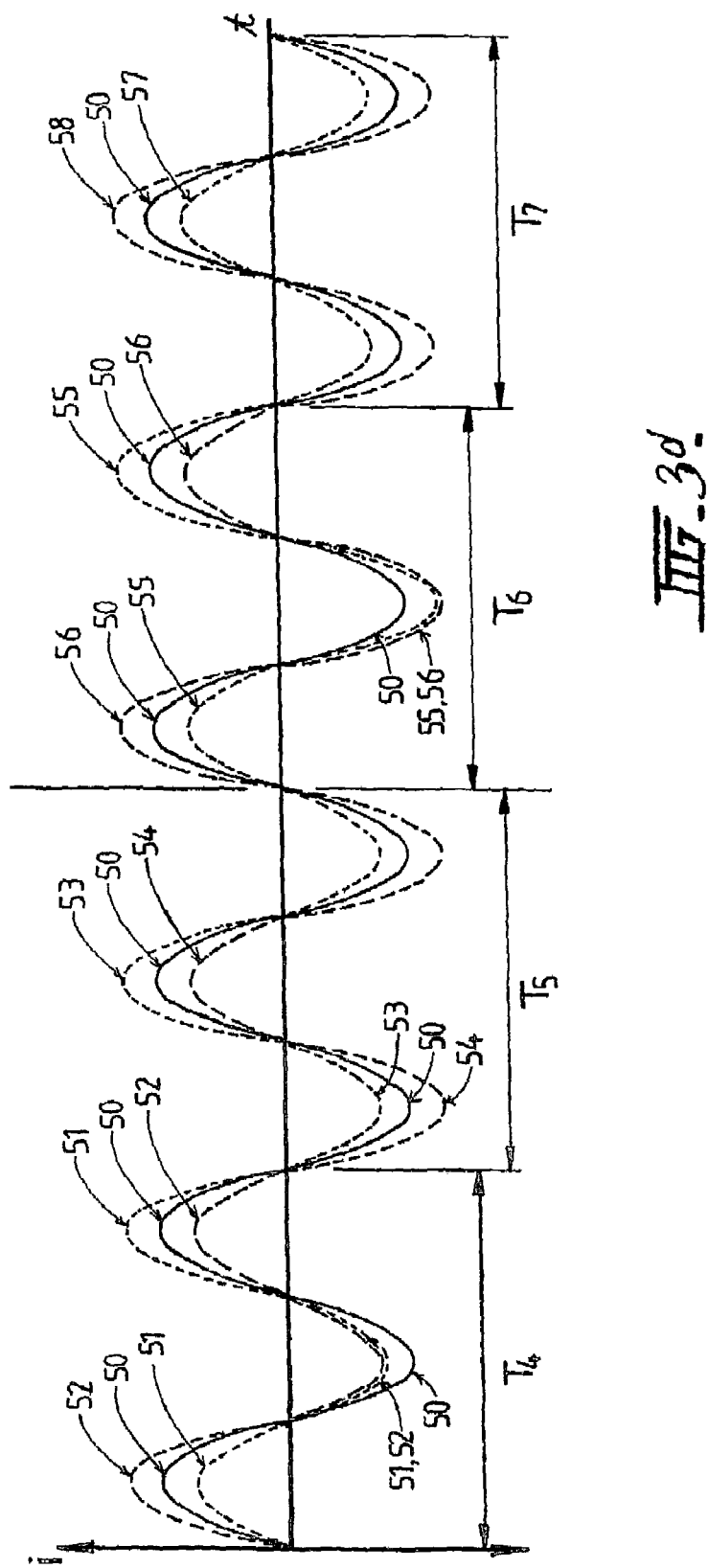

POWER LINE COMMUNICATIONS METHOD

This application is a 371 of PCT/AU01/00818 filed on Jul. 6, 2001.

TECHNICAL FIELD

The present invention relates to power-line communications, and is applicable to both sources and loads.

BACKGROUND OF THE INVENTION

In situations where power lines exist between two devices which wish to communicate to each other, it has been recognised that the existing power lines may be used both for power transmission and communications, thereby avoiding the need to install separate communication cabling. In the past, this has been achieved by way of high speed power line modems, which are capable of connecting to the power line and inserting a carrier signal onto the power lines and additional to the power signal, and modulating the carrier signal with information to be transmitted. However, the circuitry of such modems must be able to withstand the large power levels present on the power lines, and the cost of such modems is usually significantly higher than standard modems which can be used where dedicated communications cabling is available, thereby offsetting some of the cost savings in using only a single line for both power and communications. Furthermore, devices connected to the power line are often quite simple in nature and consequently the required rate of communications will be extremely low, as only relatively small amounts of information need to be transmitted. In such situations, the high speed and high cost of a power line modem will go substantially unutilised.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

According to a first aspect the present invention provides a method of communicating over a power line comprising the step of modulating a current component of an AC power signal present on the power line.

Typically, modulation of the current component of the AC power signal will be such that 1 bit or less will be transmitted for each half sine of the AC power signal. Embodiments of this type are advantageous as they permit simple amplitude modulation of each half sine to be performed, whereby a demodulator can simply detect a peak amplitude of each half sine to determine an amplitude variation of the current component of the AC power signal.

It is envisaged that modulation of the current component of the AC power signal could occur up to a bit frequency of many hundreds of Hz, although the frequency of modulation will often be limited by a frequency response of circuitry on the power line, such as filters, inductors or transformers.

Depending on a modulation scheme employed and a data package to be sent, DC injection may occur on the power line. Preferably, the method of the present invention further comprises the steps of monitoring an amount of DC inserted during transmission of a data package, and, after transmission of the data package, correcting the inserted DC. The data package may comprise a single bit or a larger amount of information, such as a byte or a complete data message.

Further, due to the direct modulation of a power signal, power may be shifted within or between half sines of the AC power signal. Ideally, a modulation scheme is chosen to minimise or eliminate any power consumption which may be caused by the shifted power. For instance, it may be preferable to cause the power shift to occur between half sines rather than between full sines.

Further, the data is preferably transmitted in accordance with a CRC error detection code, whereby a number of errors in a data package can be detected.

In embodiments where the current component of the AC power signal varies over time, for instance in situations of a variable power output of a power source or a variable power consumption of a load, the modulation of the current component of the AC power signal is preferably a differential form of modulation, such that a variation in the absolute value of the current amplitude will not preclude or excessively increase the difficulty of detection of the differentially modulated information. For instance a photovoltaic power source may provide variable power depending on short term factors such as insolation changes caused by shading or partial shading by clouds, and to a lesser extent, longer term factors such as time of day and season. Consequently the modulation scheme employed in such applications should be insensitive to such variations.

It is to be noted that the method of the first aspect of the present invention allows communications to occur both in the direction of power flow, and against the direction of power flow. For instance, in a domestic environment, power may flow from a commercial power distribution grid to appliances (loads) in a household, and power may pass from on-site power sources, such as a photovoltaic system, to the grid. Both involve the use of a grid interface unit (GIU), connected between the loads/sources and the grid. In such an environment, communications may be desired between the GIU and both the loads and the sources. As will be readily apparent, a power source such as the photovoltaic system need merely be operable to produce AC power with amplitude modulation of the current component of the AC power signal. Such modulation enables the GIU to determine the information transmitted by the source.

Where communications is desired against the direction of power flow, for example from a domestic appliance (load) having a Power Factor Control (PFC) circuit to a GIU, the modulation of the power signal may be performed by the PFC controlling the current drawn by the load to thereby represent information to be transmitted in accordance with a modulation scheme being employed. Hence, circuitry situated elsewhere on the power line (such as the GIU) can monitor the AC current flow drawn by the load and thus demodulate the transmitted information.

The method may be used in communications between a grid interface unit and a plurality of appliances on a single power line, for instance by the use of time division multiplexing or other form of multiplexing.

The step of modulating the current signal may be performed by amplitude modulation or another type of modulation as will be recognised by one skilled in the art.

The method of the first aspect of the present invention preferably comprises the preliminary step of transmitting a preamble to allow a receiver to determine commencement of a sent message.

According to a second aspect the present invention provides a communications protocol for communication between a monitoring unit and an appliance, the protocol having two modes of operation, the first mode being an on-line single direction protocol for communications from the appliance to the monitoring unit via modulation of a current component of an AC power signal between the monitoring unit and the appliance, and the second mode being an off-line protocol for communications at least from the monitoring unit to the appliance, the second mode being operable only when the power signal is not present between the monitoring unit and the appliance.

The second aspect of the present invention is of particular advantage where it is desired to monitor one or more appliances. In such embodiments, most communications would typically take place in the on-line mode, as most information would consist of status signals passing from the appliance(s) to the monitoring unit. Such embodiments of the second aspect of the present invention allow the monitoring to take place without significant interruption of power, and without the need to use a separate communications line or a power line modem.

The monitoring unit could comprise a grid interface unit or a dedicated monitoring unit, while each appliance may be a power source (such as a grid-interactive inverter) or a load (such as a domestic appliance). Where the appliance is a power source, the modulation of the power signal may occur at the same time as the power signal is formed. For instance, where the appliance is an inverter for converting a DC power input to an AC power output (ie the power signal) for insertion onto a commercial power distribution grid via a grid interface unit, the inverter may be operable to selectively modulate the AC power output while it is generated (for instance by amplitude modulation), thereby passing communications to the grid interface unit.

Alternatively, where the appliance is a load such as a domestic appliance, having a Power Factor Control circuit, the modulation of the power signal may be performed by the PFC controlling the current drawn by the load to thereby represent information to be transmitted in accordance with a modulation scheme being employed. Hence, the monitoring unit can monitor the current drawn by the appliance and demodulate the information thus transmitted.

The second mode of operation is preferably commenced by the monitoring unit disconnecting the power such that no power signal is present between the monitoring unit and the appliance(s). The power may be disconnected by using relays at the monitoring unit to switch the appliance(s) to communications circuitry in the monitoring unit. The communications circuitry preferably is capable of decoding communications from the appliance(s) and generating communications to the appliances. In preferred embodiments, during the second mode of operation each power source does not produce power, and each load does not consume power. During the second mode, two-way communication may take place, for example duplex or half-duplex communication. The monitoring unit may poll each appliance during the second mode of operation.

In embodiments of the invention where more than one appliance communicates with the monitoring unit, a multiplexing scheme is preferably implemented to ensure that communications of each appliance are not corrupted by communications of another appliance and to allow the monitoring unit to differentiate between communications from each appliance. The multiplexing scheme may consist of time division multiplexing (TDMA) or other appropriate multiplexing scheme. In particular, the use of the term multiplexing is intended to encompass the use of a polling scheme.

BRIEF DESCRIPTION OF THE DRAWINGS

Embodiments of the invention will now be described by way of example, with reference to the accompanying drawings in which:

FIGS. 3a to 3d illustrate methods of modulating a current component of an AC power signal present on a power line in order to represent information.

DETAILED DESCRIPTION OF EMBODIMENTS OF THE INVENTION

Figure 1:
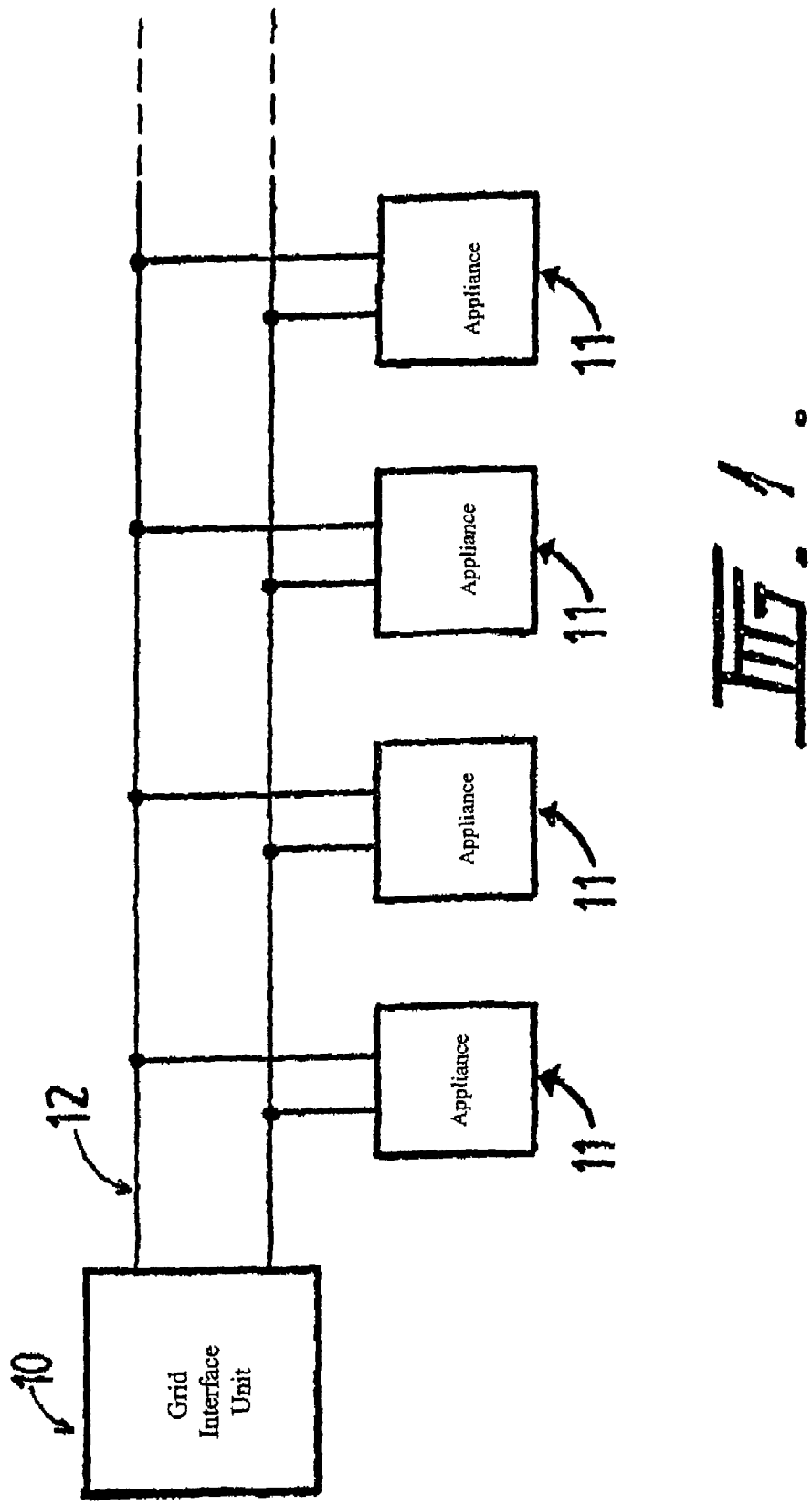
FIG. 1 illustrates an embodiment of the invention in which a grid interface unit is operable to communicate with a plurality of appliances.

FIG. 1 illustrates an embodiment of the invention in which a grid interface unit 10 is operable to communicate with a plurality of appliances 11 over power line 12. Communications between the grid interface unit 10 and the appliances 11 are conducted in accordance with the communications protocol of the second aspect of the present invention. During the first mode of operation, on-line communications are conducted in a single direction, from the appliances 11 to the grid interface unit 10, by modulation of a current component of a power signal passed between the grid interface unit 10 and the appliances 11. Hence, during the first mode of operation, there is provided a simplex (one-way) channel from the appliances to the grid interface unit.

As can be seen, the present invention is of particular advantage where it is desired to monitor one or more appliances, particularly as the monitoring can be performed by a pre-existing component in the power system, namely the GIU 10. As most information consists of status signals passing from the appliances 11 to the GIU 10, most communications would typically take place in the on-line mode, allowing the monitoring to take place without significant interruption of power, and without the need to use a separate communications line or a power line modem.

Figure 2:
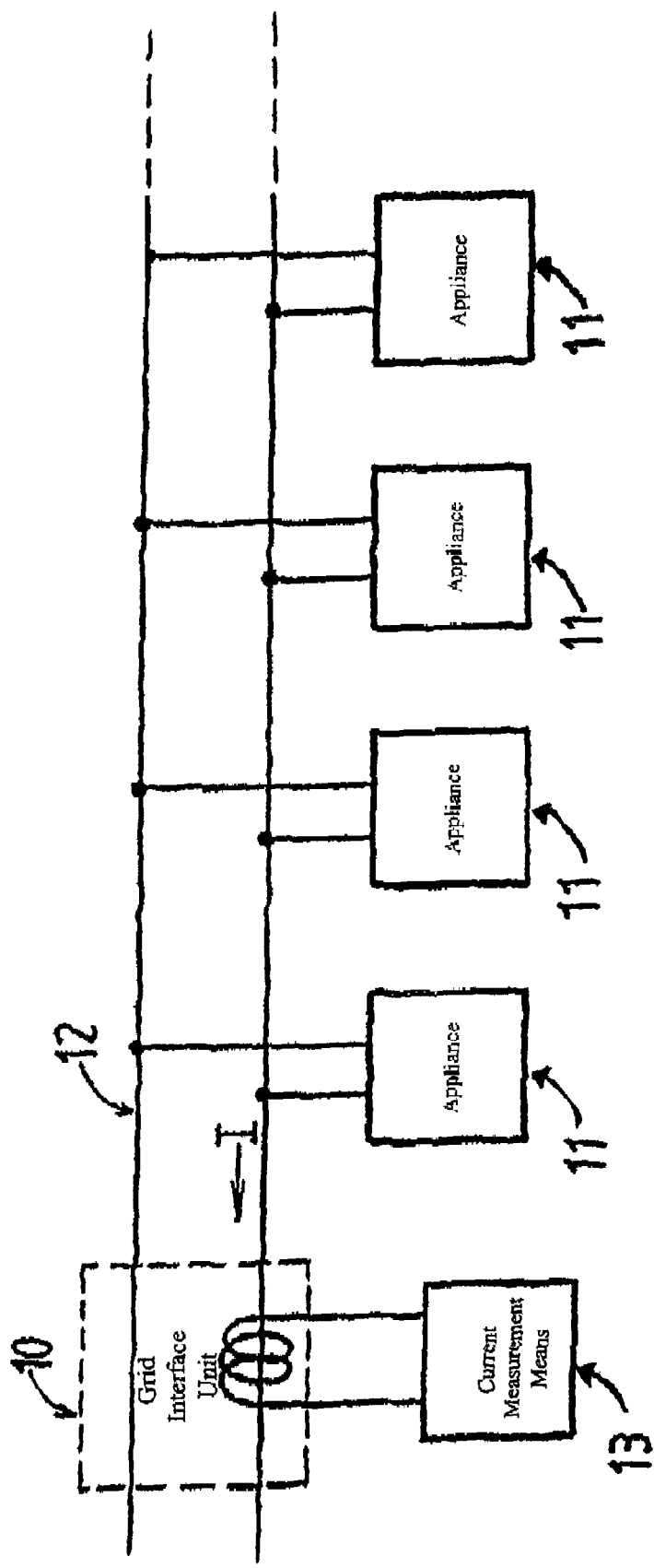
FIG. 2 illustrates operation of the circuit of FIG. 1 in an on-line mode.

As shown in FIG. 2, power generated by the appliances 11 is fed into the grid via the grid interface unit 10. The grid interface unit 10 measures the total appliance current I for each half-sine with current measurement means 13, and so the appliances 11 can transmit information to the grid interface unit 10 along the power lines 12 by modulating the amplitude of the current flow. The grid interface unit 10 measures and decodes this output current variation. Very little or no additional circuitry is required in the appliances 11, beyond that which is required for normal operation.

For those appliances 11 which are power sources, the modulation of the power signal may occur at the same time as the power signal is formed by the power source. In the present embodiment, where an appliance 11 is an inverter for converting a DC power input to an AC power output (ie the power signal), for insertion onto a commercial power distribution grid via the grid interface unit 10, the inverter will be operable to selectively modulate the AC power output while it is generated (for instance by amplitude modulation), thereby passing communications to the GIU 10. It will be within the knowledge of those skilled in the art that this may be performed, for example, with a switch mode power conversion device operating as an inverter.

Alternatively, where an appliance 11 is a load such as a domestic appliance, having a Power Factor Control circuit, the modulation of the power signal may be performed by the PFC controlling the current drawn by the load to thereby represent information to be transmitted in accordance with a modulation scheme being employed. Hence, the GIU 10 can monitor the current drawn by the appliance 11 and demodulate the information thus transmitted.

Further, the data is preferably transmitted in accordance with a CRC error detection code, whereby a number of errors in a data package can be detected. In the present embodiment, a 21/31 BCH cyclic code is used, wherein after 21 data bits, 10 parity bits are included. It is noted that in such a scheme, bit rotation of the 31 bit code will result in another valid code. Therefore, in cases where the receiver is out of phase with the incoming data, there is some chance that the additional bit or bits which will be incorrectly read as part of the 31 bit code will in fact yield a valid code, and so the phase error will not be detected. For example, where the receiver is one bit out of phase, the probability of failure to detect the error is 50%, which is unacceptably high for most applications. Therefore, a further preferred feature of the present invention is to provide a packet shuffling scheme, whereby, immediately prior to transmission, a fraction of the CRC code is shuffled to another part of the data packet so as to remove the cyclic nature of the code, and, immediately upon reception, the data packet is shuffled in the opposite manner. Such a packet shuffling scheme reduces the likelihood that the cyclical nature of the CRC code will lead to failure to detect phase errors.

For example, in a 31 bit data packet which concludes with 10 parity bits, the final eight parity bits may be swapped with the eighth to fifteenth bits of the packet immediately prior to transmission, and swapped back immediately upon reception at a receiver. A phase error at the receiver is then more likely to be detected.

The modulation scheme employed in accordance with the present invention may be effected in a variety of ways, a range of which are shown in FIGS. 3a to 3d each illustrating a method of modulating a current component of an AC power signal present on a power line in order to represent information. The discussion of FIGS. 3a to 3d is with reference to signals generated by a power source, however it will be understood that the following is also applicable to modulation of a current drawn by a load. It is to be noted that in situations where both sources and loads are employing a modulation scheme in accordance with the present invention, sources should modulate the power signal in the opposite manner to loads. For example, where a source would increase the amplitude of a half sine, a load should decrease the amplitude, and vice versa This arrangement is desirable as it causes modulation by loads and sources to take the same effect at the grid interface.

Figure 3A:
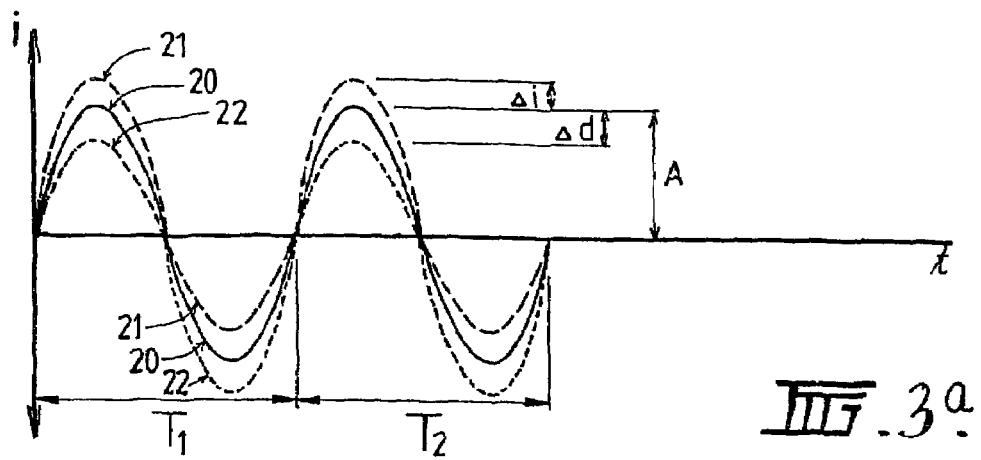

FIG. 3a illustrates a first modulation scheme which may be employed in the present invention, in which current waveform 20 is the 'normal' or unmodulated current waveform produced by a power source, having approximately equal magnitude of the positive half sine and the negative half sine. When it is desired to transmit a bit of information during time period $T_1$, the power source will produce current waveform 21 to transmit a '1', or current waveform 22 to transmit a '0'.

In transmitting a '1', the magnitude of the positive half sine is increased relative to the normal waveform 20, and the magnitude of the following negative half sine is decreased. Conversely, in transmitting a '0', the magnitude of the positive half sine is decreased relative to the normal waveform 20 and the magnitude of the following negative half sine is increased.

Hence, each transmission of a '1' causes a positive net DC injection, and each transmission of a '0' causes a negative net DC injection. Therefore, when such a modulation scheme is employed, the method of the present invention includes the steps of monitoring an amount of DC inserted during transmission of a data package, and, after transmission of the data package, correcting the inserted DC. Further, it may be necessary to limit a data package length to ensure that a transmission of all '0's or all '1's will not cause DC injection to exceed a predefined limit, for example, a limit defined by AS3300 in Australia.

Following transmission of a bit in period $T_1$, a second bit can be transmitted in period $T_2$. Hence the modulation scheme of FIG. 3a provides a data rate equal to the power line frequency (50 Hz in Australia, therefore 50 bps).

Figure 3B:
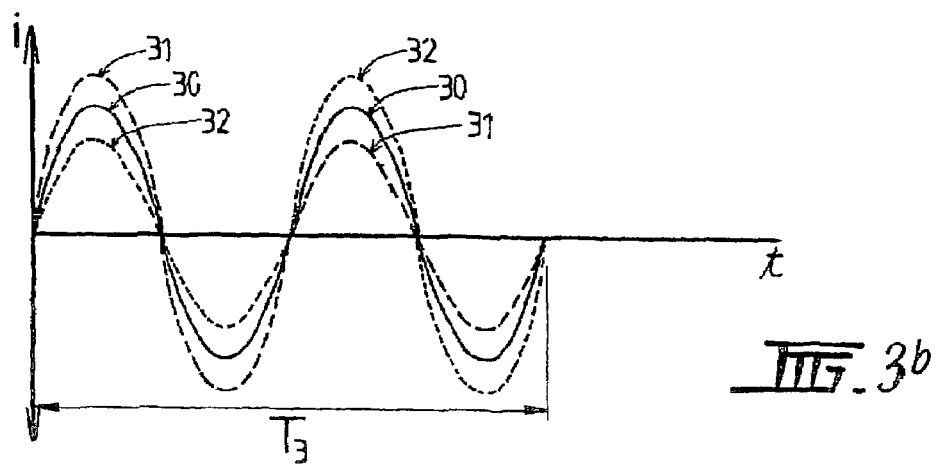

FIG. 3b illustrates a second modulation scheme which may be employed in the present invention, in which current waveform 30 is the 'normal' or unmodulated current waveform produced by a power source, having approximately equal magnitude of each positive and negative half sine. When it is desired to transmit a bit of information during time period $T_3$, the power source will produce current waveform 31 to transmit a '1', or current waveform 32 to transmit a '0'.

In transmitting a '1', current waveform 31 consists of a positive and negative half sine both of increased magnitude, followed by a positive and negative half sine both of reduced magnitude. Conversely, in transmitting a '0', current waveform 32 consists of a positive and negative half sine both of decreased magnitude, followed by a positive and negative half sine both of increased magnitude. Hence, neither transmission of a '1' or a '0' causes any net DC injection. However, the average power level varies between successive full sines. The modulation scheme of FIG. 3b provides a data rate of half the power line frequency (50 Hz in Australia, therefore 25 bps).

Figure 3C:
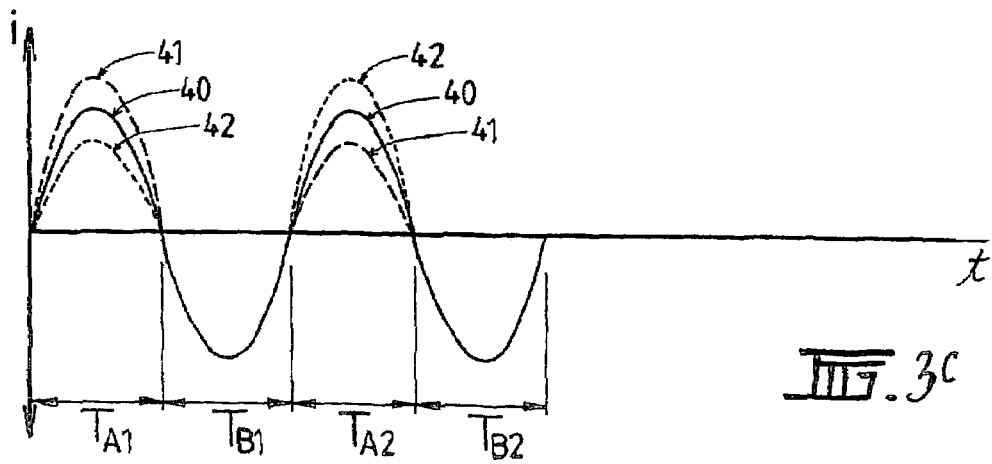

FIG. 3c illustrates a third modulation scheme which may be employed in the present invention, in which current waveform 40 is the 'normal' or unmodulated current waveform produced by a power source, having approximately equal magnitude of each positive and negative half sine. In this modulation scheme, a bit 'A' is transmitted during time periods $T_{A1}$, and $T_{A2}$, that is, on successive positive half sines. When it is desired to transmit bit 'A', the power source will produce current waveform 41 to transmit a '1', or current waveform 42 to transmit a '0'.

In transmitting a '1', current waveform 41 consists of a positive half sine of increased magnitude, followed by a positive half sine of reduced magnitude. Conversely, in transmitting a '0', current waveform 42 consists of a positive half sine of decreased magnitude, followed by a positive half sine of increased magnitude. Hence, neither transmission of a '1' or a '0' causes any net DC injection. Again, the average power level varies between successive positive half sines. A second bit 'B' may be transmitted during time periods $T_{B1}$ and $T_{B2}$ in a similar manner. The modulation scheme of FIG. 3c provides a data rate equal to the power line frequency (50 Hz in Australia, therefore 50 bps).

FIG. 3d illustrates a fourth modulation scheme which may be employed in the present invention, in which current waveform 50 is the 'normal' or unmodulated current waveform produced by a power source, having approximately equal magnitude of each positive and negative half sine. A first scheme is selected by which one of four possible current waveforms is transmitted over 3 half sines of the power signal to represent a '0', '1', '2' or '3', thereby enabling 2 bits to be transmitted for every 3 half sines. In FIG. 3d, current waveform 51 represents a '0', and waveform 52 represents a '1', other possible current waveforms which could be used to represent a '2' or a '3' not being shown for period $T_4$ for clarity purposes.

It will be appreciated that alternating waveforms, being of 3 half cycles, will start with either a positive half sine or a negative half sine, and in time period $T_5$, waveform 53 represents a '2' and waveform 54 represents a '3', other possible waveforms which could be used to represent a '0' or a '1' not being shown for period $T_5$ for clarity purposes.

It is to be noted that in modulating each half sine by increasing or decreasing an amplitude of each half sine, there are $2^3$ (ie eight) possible current waveforms which can be transmitted over 3 half cycles. Therefore, the use of only four such waveforms for the first scheme, enables the remaining four waveforms to also be allocated as a '0', '1', '2' or '3' so that a second scheme may also be used. With appropriate selection of waveforms for each scheme, each 2 bits of the data may be sent in accordance with either the first scheme or the second scheme, which allows correction of injected DC, or average power, to be performed 'on the run' throughout transmission. In FIG. 3d, waveforms 55 and 56 represent waveforms of a second scheme used respectively to represent a '0' or a '1' in time period $T_6$, and waveforms 57 and 58 represent waveforms of the second scheme used respectively to represent a '2' or a '3' in time period $T_7$. Again, waveforms which could be used to transmit a '2' or a '3' in period $T_6$ or a '0' or a '1' in period $T_7$, are not shown.

The modulation scheme of FIG. 3d provides a data rate equal to four thirds of the power line frequency (50 Hz in Australia, therefore 66.7 bps).

Other modulation schemes which could be employed include simple AM modulation at (for example) 100 baud or 50 baud, in which the half sine (100 baud) or full sine (50 baud) is modulated to indicate a zero or a one.

The calculated performance of the previously described modulation schemes is outlined in Table 1.

In Table 1, row (1) indicates the number of seconds required for each modulation scheme to transmit a 35 bit data package on a 50 Hz grid which can be seen to follow directly from the data rate provided by the respective modulation scheme. Row (2) gives the maximum possible number of consecutive half sines of increased magnitude which can occur for each modulation scheme, assuming a 31 bit sequence. This is significant as a long sequence of half sines of increased magnitude represents an increase in power demand on the power source. For each scheme, this is the same as the maximum possible number of consecutive half sines of decreased magnitude which can occur.

Row (3) represents the power loss at the transmitter by using each modulation scheme. This is specific to photovoltaic modules and representative of the extent to which each modulation scheme takes the PV module away from a maximum power point, with the unencoded AM modulation schemes clearly the worst, while row (4) indicates the level of transmitter modulation achievable for a given power loss (row 3) and $R_x$ bit error rate. Row (5) relates to whether a change in A (average peak current magnitude, which for example could be caused by insolation variation in a photovoltaic power supply) will affect a receiver's ability to decode the signal, with the differential modulation schemes performing better in this regard. Row (6) indicates the receiver sensitivity to a DC offset error, however this factor can be of minimal importance, as some receivers can compensate for or correct problems in this regard. The use of TDMA for example, allows measurement of offset error between periods of transmission, allowing compensation to be made for any DC offset which may exist.

Row (7) relates to the difficulty of keeping the receiver in phase with the incoming signal. Schemes such as the interleaved 50 bps demand correct sequencing of successive positive half sines, hence their performance in this regard is only average. Finally row (8) indicates the extent to which each scheme injects DC.

It is to be noted that in the embodiments shown in FIGS. 3a to 3d, modulation of the current component of the AC power signal is such that 1 bit or less is transmitted for each half sine of the AC power signal. Embodiments of this type are advantageous as they permit simple amplitude modulation of each half sine to be performed, whereby a demodu-

TABLE 1

|  | 50 bps (FIG. 3a) | 25 bps (FIG. 3b) | Interleaved 50 bps (FIG. 3c) | 67 AM encoded (FIG. 3d) | 100 AM | 50 AM |
|---|---|---|---|---|---|---|
| 1) $T_x$ time (s) | 0.7 | 1.4 | 0.7 | 0.525 | 0.35 | 0.7 |
| 2) Max run of high/low half sines | 2 | 4 | 4 | 3 | 31 | 62 |
| 3) Low $T_x$ power loss (PV) | Very good | Very good | Very good | Very good | Poor | Very poor |
| 4) High $T_x$ modulation | Average | Very poor | Very poor | Poor | Good | Very good |
| 5) Low $R_x$ Average sensitivity | Very good | Average | Good | Good | Very poor | Very poor |
| 6) Low $R_x$ DC offset sensitivity | Poor | Very good | Very good | Poor | Poor | Very good |
| 7) Low $R_x$ data phase sensitivity | Very good | Average | Average | Poor | Very good | Very good |
| 8) Low DC injection | Poor | Very good | Very good | Good | Poor | Very good | lator can simply detect a peak amplitude of each half sine to determine an amplitude variation compared to an average amplitude of the current component of the AC power signal.

Further, as shown in FIG. 3a, the amount by which each half sine is increased ($\Delta i$) or decreased ($\Delta d$) relative to a normal magnitude A should be carefully considered. In embodiments such as a photovoltaic-driven inverter producing the modulated current waveform, the modulation level used is a trade-off between a sufficiently large level to overcome noisy environments and satisfy receiver sensitivity, but should be kept small in order to maintain the photovoltaic source at or near a maximum power point voltage, and to minimise power losses associated with the change in current magnitude. In the present embodiment, ($\Delta i + \Delta d$)≈0.2A.

In embodiments of the invention such as that shown in FIG. 1, where more than one appliance 11 transmits communications to the grid interface unit 10, a multiplexing scheme is preferably used to allow the grid interface unit 10 to differentiate between transmissions from the different appliances 11. For example, TDMA (time division multiplex access), is a scheme whereby only one appliance can transmit at a time. Each appliance 11 has parameters to define the assigned timeslot for packet transmission, the period between transmissions, and generally, the manner in which information is to be transmitted in the packet. Additionally, the timing of the timeslots has to be synchronised for all the appliances 11 so that their transmissions will not clash. To prevent clashes, an appliance 11 will not transmit packets until all of this information is sent. This information can be transmitted to the appliances 11 using the offline mode of communications.

Alternatively, CDMA (code division multiplex access) may be implemented, which uses a different pseudo-random number binary sequence for each appliance 11 to modulate the data. This allows simultaneous transfer of packets from multiple appliances 11. However, the data rates are much lower, decreasing as the number of appliances 11 and the required sequence length increases.

Figure 4:
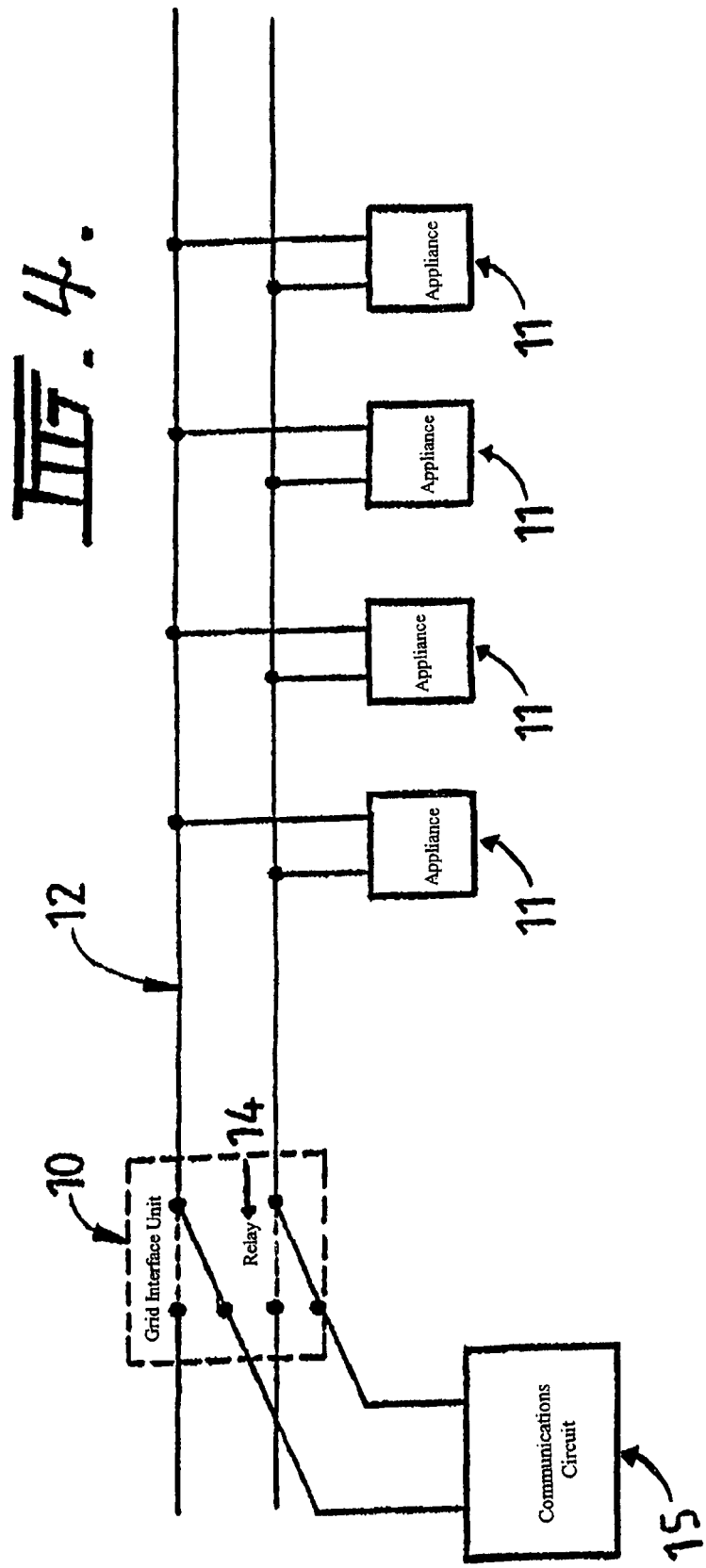
FIG. 4 illustrates operation of the circuit of FIG. 1 in an off-line mode.

FIG. 4 illustrates the second mode of operation which is an off-line protocol for two way communications between the grid interface unit 10 and the appliances 11. The second mode of operation is only operable when no power signal is present on power lines 12, which, in the present embodiment, occurs when relay 14 switches appliances 11 from the grid into the dedicated communications circuitry 15 in the grid interface unit 10, the communications circuitry being capable of decoding communications from the appliances and generating communications to the appliances. The power lines 12 are then used for half-duplex communications. In the present embodiment, the off-line mode involves transmission of both voltage modulated and current modulated signals, however it will be appreciated that other modulation schemes may be used in the off-line mode.

The communications circuitry 15 is required to generate and decode the digital communications signals between the grid interface unit 10 and the appliances 11. The grid interface unit 10 operates as a master, polling the appliances 11.

Where an appliance is an inverter, the same circuitry can be used to generate and detect communication signals as is used for power generation and grid polarity measurement. Thus, little or no additional circuitry for detection, generation, or protection is required.

During the communications process, the communications circuitry of appliances 11 that don't generate power can be powered from the incoming communications signal, at the cost of some additional circuitry, or alternatively by storing power from the grid. The first option would make it possible to communicate with the appliances 11 without them being plugged into the grid, using a portable version of the grid interface unit 10.

Appliances with a large reactive component should be disconnected from the grid for the time it takes the output voltage to decay, before commencing communications. For appliances with a low reactive component, the communications method can be speeded by using triacs to disconnect the grid and modulate at a high baud rate, which could allow a whole transfer (grid interface unit poll and appliance response) to take place in very few mains cycles, possibly having little effect on the devices' operation.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A communications protocol for communication between a monitoring unit and an appliance, the protocol having two modes of operation, the first mode being an on-line single direction protocol for communications from the appliance to the monitoring unit via modulation of a current component of an AC power signal between the monitoring unit and the appliance, and the second mode being an off-line protocol for communications at least from the monitoring unit to the appliance, the second mode being operable only when the power signal is not present between the monitoring unit and the appliance.

2. The protocol of claim 1 wherein modulation of the current component of the AC power signal in the first mode is such that 1 bit or less is transmitted for each half sine of the AC power signal.

3. The protocol of claim 1 wherein an amount of DC inserted during the first mode of operation is monitored.

4. The protocol of any one of claims 1 to 3 wherein DC inserted during the first mode of operation is corrected.

5. The protocol of claim 4 wherein the step of correcting occurs after the first mode of operation.

6. The protocol of any one of claims 1 to 3 wherein the modulation of the current component of the AC power signal is such that power is shifted between half sines of the AC power signal.

7. The protocol of any one of claims 1 to 3 wherein the modulation of the current component of the AC power signal is in accordance with a CRC error detection code.

8. The protocol of any one of claims 1 to 3 wherein a differential modulation scheme is used to modulate the current component of the AC power signal.

9. The protocol of any one of claims 1 to 3 wherein modulation of the current component of the AC power signal is performed by amplitude modulation.

10. The protocol of any one of claims 1 to 3 wherein during the first mode a preamble is transmitted to allow a receiver to determine commencement of a sent message.

11. The protocol of any one of claims 1 to 3 wherein the second mode of operation commences upon disconnection of the AC power signal by the monitoring unit such that no power signal is present between the monitoring unit and the appliance.

12. The protocol of any one of claims 1 to 3 wherein two-way communication takes place during the second mode.

13. The protocol of any one of claims 1 to 3 wherein a multiplexing scheme is used during the first and second modes of operation to accommodate communications with a plurality of appliances.

14. A communications system for an electrical power environment comprising a monitoring unit and an appliance each operable in accordance with the protocol of any one of claims 1 to 3.

15. The communications system of claim 14 wherein the monitoring unit is a grid interface unit.

16. The communications system of claim 14 wherein the appliance is a power source.

17. The communications system of claim 16 wherein the power source is a grid-interactive inverter.

18. The communications system of claim 16 wherein modulation occurs at the same time as the power signal is formed.

19. The communications system of claim 14 wherein the appliance is a load.

20. The communications system of claim 19 wherein modulation is performed by a Power Factor Control circuit controlling current drawn by the load.

* * * * *